(12) United States Patent
Cha et al.

(10) Patent No.: US 11,479,143 B2
(45) Date of Patent: Oct. 25, 2022

(54) VARIABLE BODY VEHICLE

(71) Applicants: Hyundai Motor Company, Seoul (KR); Kia Motors Corporation, Seoul (KR)

(72) Inventors: Dong Eun Cha, Hwaseong-si (KR); Wan Jae Shin, Seoul (KR); Jin Ho Hwang, Cheonan-si (KR); Ju Hoon Park, Seoul (KR); Seo Young Kim, Busan (KR); Sang Heon Lee, Seoul (KR); Byung Woo Kim, Seoul (KR); Chang Woo Shim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 71 days.

(21) Appl. No.: 17/017,415

(22) Filed: Sep. 10, 2020

(65) Prior Publication Data
US 2021/0323440 A1    Oct. 21, 2021

(30) Foreign Application Priority Data

Apr. 20, 2020    (KR) .................... 10-2020-0047553

(51) Int. Cl.
*B60K 1/02*    (2006.01)
*B60L 58/13*    (2019.01)
(Continued)

(52) U.S. Cl.
CPC ............... *B60L 58/13* (2019.02); *B60K 1/02* (2013.01); *B60K 1/04* (2013.01); *B60K 17/356* (2013.01);
(Continued)

(58) Field of Classification Search
CPC .. B60L 1/00; B60L 50/66; B60L 58/22; B60L 533/53; B60L 58/13; B60K 1/02;
(Continued)

(56) References Cited

U.S. PATENT DOCUMENTS

| 6,781,343 | B1 * | 8/2004 | Demachi | ............... | H02J 7/0018 |
| | | | | | 320/101 |
| 10,870,341 | B2 * | 12/2020 | Hung | ..................... | B62D 21/14 |

FOREIGN PATENT DOCUMENTS

| JP | 2019117380 A | 7/2019 |
| KR | 10-2011-0099795 A | 9/2011 |

(Continued)

*Primary Examiner* — James A English
*Assistant Examiner* — James J Triggs
(74) *Attorney, Agent, or Firm* — Morgan, Lewis & Bockius LLP

(57) ABSTRACT

A variable body vehicle may include a drive module having drive the vehicle wheels provided at a lower portion of the drive module; a body module coupled to an external side of the drive module and forming an internal space of the vehicle; and a battery-mounting portion formed in the drive module or the body module to mount a battery therein, providing electric power to the battery when the battery is mounted, and determining a driving mode of the vehicle by allowing the battery to be selectively mounted in the drive module, wherein a body of the vehicle is variable by a combination between the drive module and the body module according to a purpose of use.

19 Claims, 10 Drawing Sheets

(51) Int. Cl.
*B60L 1/00* (2006.01)
*B60L 50/60* (2019.01)
*B60L 58/22* (2019.01)
*B60K 1/04* (2019.01)
*B60K 17/356* (2006.01)
*B60L 53/53* (2019.01)

(52) U.S. Cl.
CPC .................. *B60L 1/00* (2013.01); *B60L 50/66* (2019.02); *B60L 53/53* (2019.02); *B60L 58/22* (2019.02); *B60K 2001/0411* (2013.01); *B60K 2001/0416* (2013.01)

(58) Field of Classification Search
CPC .............. B60K 1/04; B60K 2001/0416; B60K 2001/0411; B60K 17/356
See application file for complete search history.

(56) References Cited

FOREIGN PATENT DOCUMENTS

| | | |
|---|---|---|
| KR | 10-2019-0029875 | 3/2019 |
| KR | 10-2020-0012858 A | 2/2020 |

\* cited by examiner

VARIABLE BODY VEHICLE

CROSS REFERENCE TO RELATED APPLICATION

The present application claims priority to Korean Patent Application No. 10-2020-0047553, filed Apr. 20, 2020, the entire contents of which is incorporated herein for all purposes by this reference.

BACKGROUND OF THE INVENTION

Field of the Invention

The present invention relates to a variable body vehicle having a body capable of being suitably configured and used according to a purpose by selectively combining drive modules and body modules with each other and including a drive battery and a body battery configured to be charged with electric power of each other based on states of charge of the batteries.

Description of Related Art

Since the first internal combustion vehicle emerged in the 1800's, vehicles have been continuously developed. The development has been conducted as to durability and stability, and power sources have also been changed from fossil fuels through electric batteries to fuel cells. With an improvement in autonomous driving technology, it is expected that new-concept vehicles different from current ones will emerge in the future.

However, a vehicle purchaser is still limited to purchasing and using a finished vehicle produced by a finished vehicle manufacturing company. The purchaser needs to purchase a finished vehicle according to a purpose, and thus, the purchaser has to purchase a vehicle according to each purpose of use. For example, a person possessing a passenger vehicle for transportation also has to purchase a freight vehicle for carrying freight. A vehicle could be purchased within the limit of finished vehicles provided by the manufacturing company, and a vehicle having a body which may be actively configured according to a purpose of use and a preference has not yet been developed.

The finished vehicle manufacturing company, which manufactures and sells finished vehicles only, has dead stock of finished vehicles. Accordingly, conventional vehicles have a problem in that manufacturing costs are increased and processing costs for the dead stock of finished vehicles are incurred.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a variable body vehicle having a body configured for being configured and used according to a purpose by selectively combining and connecting drive modules and body modules forming the body to each other by a user and mounting batteries according to a need.

According to various exemplary embodiments of the present invention, a variable body vehicle includes: a drive module having drive the vehicle wheels provided at a lower portion of the drive module; a body module coupled to an external side of the drive module and forming an internal space of the vehicle; and a battery-mounting portion formed in the drive module or the body module to mount a battery therein, providing electric power to the battery when the battery is mounted, and determining a driving mode of the vehicle by allowing the battery to be selectively mounted in the drive module, wherein a body of the vehicle is variable by a combination between the drive module and the body module according to a purpose of use.

The drive module may include a first drive module mounted on a front side of the vehicle and a second drive module mounted on a rear side of the vehicle, and the body module may be connected between the first drive module and the second drive module to configure the body.

The battery may be mounted in both the respective battery-mounting portions of the first drive module and the second drive module such that the vehicle is four-wheel or two-wheel driven.

The battery may be mounted in the battery-mounting portion of the first drive module, without being mounted in the battery-mounting portion of the second drive module such that the vehicle is front-wheel driven.

The battery may be mounted in the battery-mounting portion of the second drive module, without being mounted in the battery-mounting portion of the first drive module such that the vehicle is rear-wheel driven.

The drive module may include a first drive module mounted on a front side of the vehicle and a second drive module mounted on a rear side of the vehicle, and the body module may include a first body module connected to the first drive module and a second body module connected to the second drive module.

The battery may be mounted in both the respective battery-mounting portions of the first drive module and the second drive module such that the vehicle is four-wheel or two-wheel driven.

The battery may be mounted in the battery-mounting portion of the first drive module, without being mounted in the battery-mounting portion of the second drive module such that the vehicle is front-wheel driven.

The battery may be mounted in the battery-mounting portion of the second drive module, without being mounted in the battery-mounting portion of the first drive module such that the vehicle is rear-wheel driven.

The numbers of drive modules and body modules may be three or more, and the three or more drive modules and body modules may be connected to each other such that the vehicle is multiple-wheel driven.

A body battery may be mounted in the battery-mounting portion of the body module and a drive battery may be mounted in the battery-mounting portion of the drive module, the body battery providing electric power to the internal space of the vehicle and the drive battery providing electric power to the drive wheels.

The body battery and the drive battery may be connected to each other, and when a state of charge (SOC) value of any one of the body battery and the drive battery is equal to or greater than a predetermined level, the any one may charge the other one.

The body battery and the drive battery may be connected to each other, and when a state of charge (SOC) value of the drive battery is equal to or greater than a predetermined level, the drive battery may be driven while charging the body battery in a travelling state of the vehicle.

The body battery and the drive battery may be connected to each other, and when a state of charge (SOC) value of the drive battery is lower than a predetermined level, if a state of charge (SOC) value of the body battery is equal to or greater than the predetermined level, the body battery may charge the drive battery.

When both states of charge of the body battery and the drive battery are lower than a predetermined level, a save mode may be activated.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
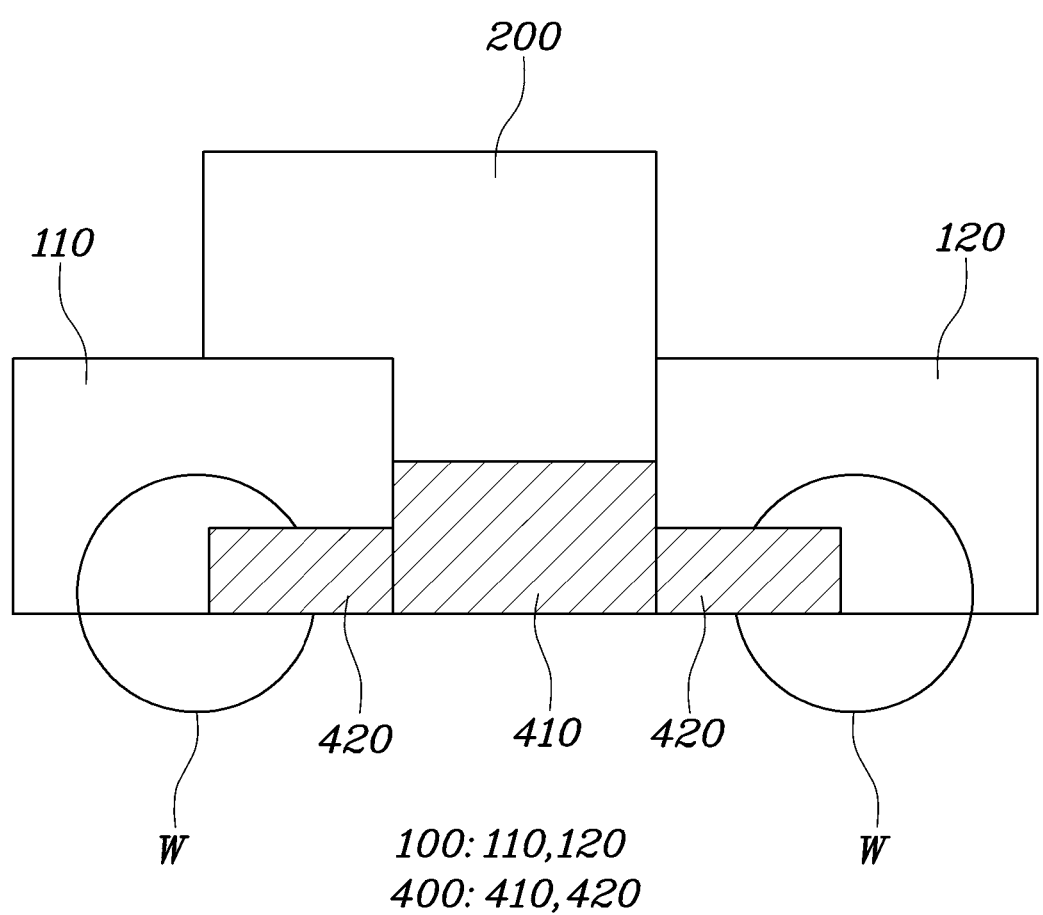
FIG. 1, FIG. 2, FIG. 3, FIG. 4, FIG. 5, FIG. 6, FIG. 7, FIG. 8 and FIG. 9 are views illustrating embodiments of a variable body vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions of embodiments according to an exemplary embodiment of the present invention in the present embodiment or application are merely illustrative for describing embodiments according to an exemplary embodiment of the present invention. Embodiments according to an exemplary embodiment of the present invention may be implemented in various forms and are not to be construed as being limited to the exemplary embodiments described in the present embodiment or application.

Since the exemplary embodiments of the present invention may be modified in various ways and take on various alternative forms, various exemplary embodiments will be illustrated in the drawings and described in detail in the present embodiment or application. However, there is no intent to limit embodiments according to the concept of the present invention to the forms disclosed, and the present invention may be construed as covering all modifications, equivalents, and alternatives falling within the spirit and technical scope of the present invention.

It may be understood that, although the terms "first", "second", and the like may be used herein to describe various elements, the elements are not limited by the terms. The terms are used only for distinguishing one element from another element. For example, a first element may be named as a second element, and similarly, the second element may be named as the first element, without departing from the scope according to the concept of the present invention.

When a certain element is referred to as being "connected" or "coupled" to another element, the certain element may be directly connected or coupled to the other element, but it may be understood that another intervening element may exist therebetween. On the other hand, when a certain element is referred to as being "directly connected" or "directly coupled" to another element, it may be understood that no intervening element exists therebetween. Other expressions for describing relationship between elements, i.e., "between", "directly between", "adjacent to", "directly adjacent to", and the like, may also be construed in the same manner.

Hereinafter, the present invention will be described in detail by describing exemplary embodiments of the present invention with reference to the accompanying drawings. Like reference numerals shown in each drawing denote like elements.

The present invention relates to a variable body vehicle having a body which is detachably connected so that the vehicle may be configured by a selective combination according to a purpose of use. By combining modules forming the body, it is possible to select a vehicle that meets any of various purposes, and thus, it is possible to provide a new-concept vehicle which may be used according to a purpose without purchasing another finished vehicle for each purpose of use.

FIG. 1, FIG. 2, FIG. 3, FIG. 4, FIG. 5, FIG. 6, FIG. 7, FIG. 8 and FIG. 9 are views illustrating embodiments of a variable body vehicle according to various exemplary embodiments of the present invention.

Referring to FIG. 1, FIG. 2, FIG. 3, FIG. 4, FIG. 5, FIG. 6, FIG. 7, FIG. 8 and FIG. 9, the vehicle according to various exemplary embodiments of the present invention may include a drive module 100, a body module 200, and a battery-mounting portion 300.

The drive module 100 and the body module 200 are components forming a vehicle body. The drive module 100 may be a driving unit of the vehicle, and the body module 200 may be a space that meets a purpose of the vehicle, for example, a space in which a person rides or a space in which articles are loaded. In the vehicle according to various exemplary embodiments of the present invention, the body may be variable by a selective combination between the drive module 100 and the body module 200 according to the purpose of use.

The drive module 100 may have drive wheels W provided at a lower portion thereof. Two drive wheels W are mounted on left and right sides of the drive module 100, respectively. The drive wheels W are not limited to wheels that are commonly used for a vehicle, and any means configured for moving the vehicle as well as the wheels may be used.

The drive module 100 may be mounted on each of front and rear sides of the vehicle to move the vehicle. In the drive module 100, the battery-mounting portion 300 may be formed to mount a battery 400 therein. The battery 400 mounted in the drive module 100 may provide a driving force to the drive wheels W.

The body module 200 is a component forming an internal space of the vehicle. The body module 200 may vary depending on a purpose of the vehicle. For example, the body module 200 may be formed as an indoor space in which a person rides in the case of a passenger car, as a freight space in which articles are loaded in the case of a freight car, as a space in which camping equipment is carried in the case of a camping car, or as a space in which cooking facilities are carried in the case of a food truck. The body module 200 may be configured in various forms according to the purpose, and a plurality of body modules 200 may be connected to each other in a vertical or horizontal direction thereof.

The body module 200 may be connected between drive modules 100 or connected to an external side of any one of the drive modules 100. The external side of the drive module 100 refers to an upper, lower, left, or right side of the drive module 100. Furthermore, the plurality of body modules 200 may be communicatively connected to each other.

The battery-mounting portion 300 is a space in which the battery 400 providing electric power may be mounted. The battery-mounting portion 300 may be formed in the drive module 100 or the body module 200 to provide electric power. The battery 400 mounted in the drive module 100 is defined as a drive battery 420, and the battery 400 mounted in the body module 200 is defined as a body battery 410.

The drive battery 420 is configured as a power source by providing electric power which is an energy source driving the vehicle. The body battery 410 may provide electric power to the internal space of the vehicle, for example, to operate electronic components or air-condition the interior of the vehicle.

The drive battery 420 may be selectively mounted in the battery-mounting portion 300 of the drive module 100. When the drive battery 420 is mounted, the drive module 100 is configured for driving by itself using its own electric power. On the other hand, when the drive battery 420 is not mounted, the drive module 100 is not configured for driving by itself, and may be directly or indirectly connected to and passively driven by another drive module 100 in which the drive battery 420 is mounted. A driving mode of the vehicle is determined depending on whether or not the drive battery 420 is mounted in the battery-mounting portion 300 of the drive module 100, which will be described in detail below.

Figure 2:
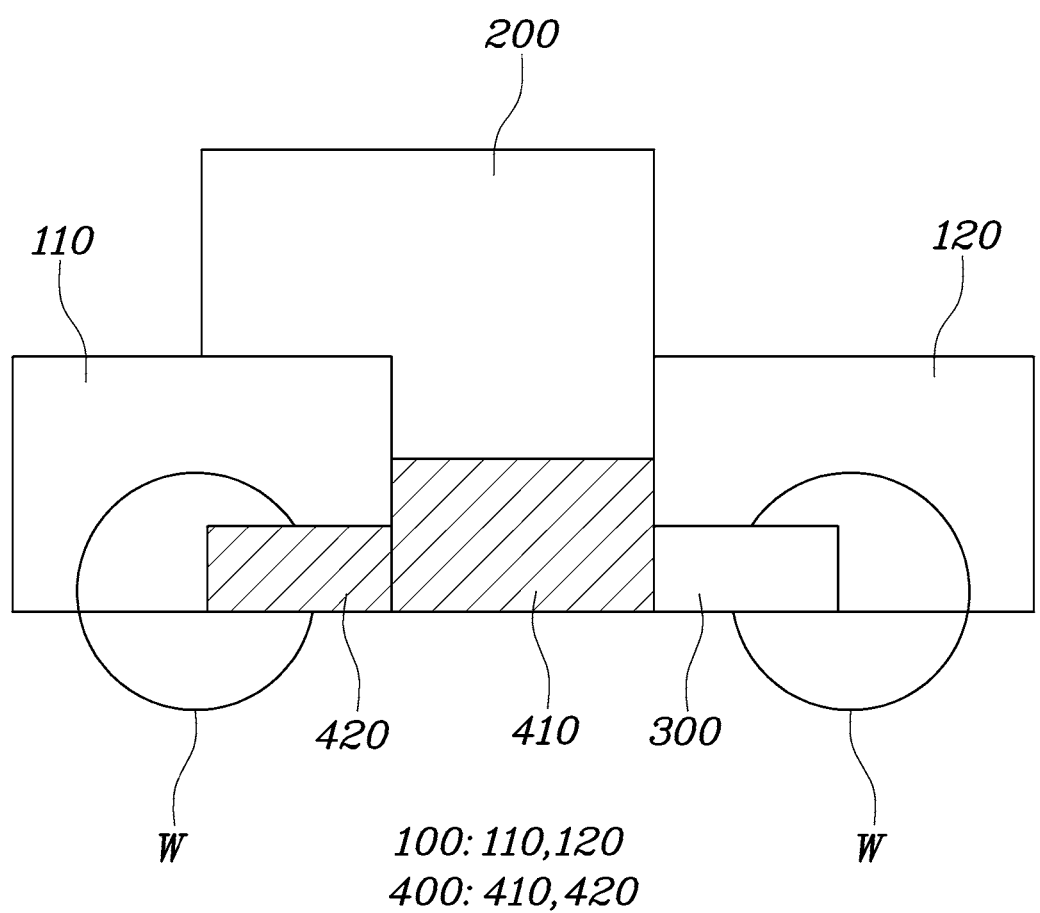
Figure 3:
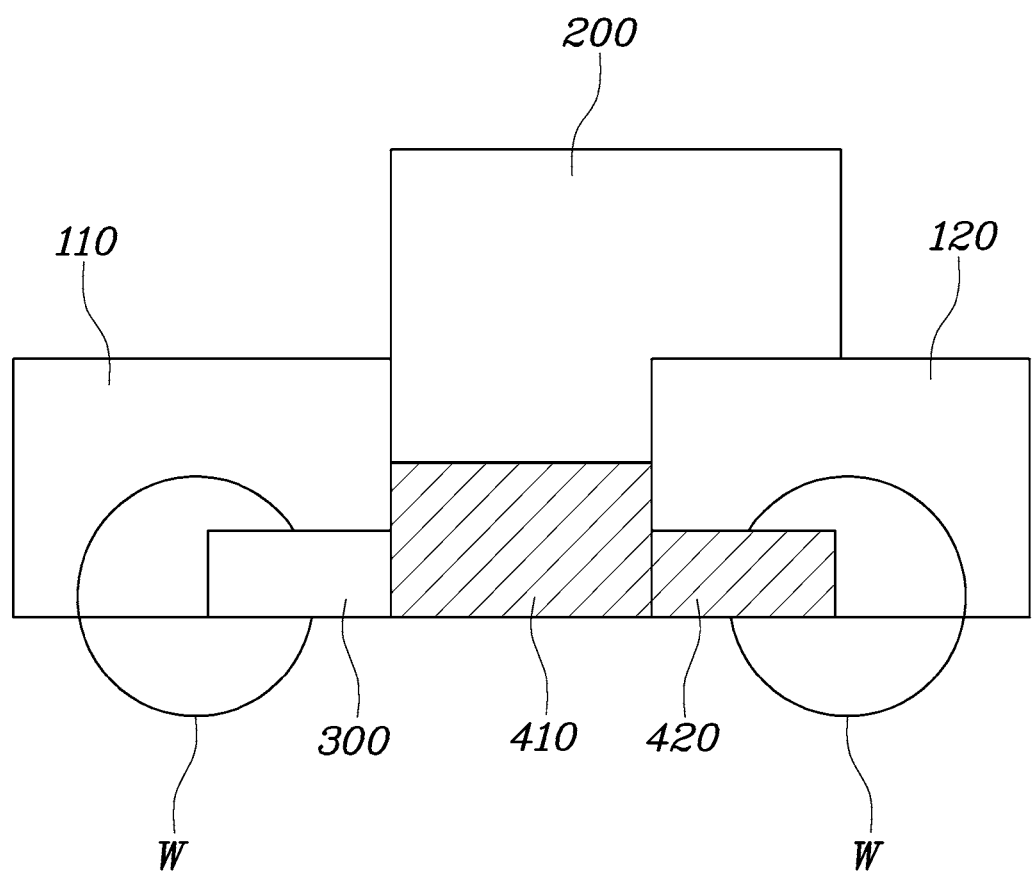

Referring to FIG. 1, FIG. 2, and FIG. 3, the drive module 100 may include a first drive module 110 mounted on the front side of the vehicle and a second drive module 120 mounted on the rear side of the vehicle, and the body module 200 may be connected between the first drive module 110 and the second drive module 120 to configure the body. In the exemplary embodiments illustrated in FIG. 1, FIG. 2, and FIG. 3, the two drive modules 110 and 120 and the one body module 200 are combined to each other to configure the body.

Referring to FIG. 1, the battery 400 may be mounted in both the respective battery-mounting portions 300 of the first drive module 110 and the second drive module 120. In the instant case, all four drive wheels W are actively driven by the batteries 400, and thus, a four-wheel drive vehicle may be formed.

The above-described embodiment is not limited to the four-wheel driving mode. When the battery 400 mounted in the first drive module 110 provides driving energy, the vehicle may be front-wheel driven, and when the battery 400 mounted in the second drive module 120 provides driving energy, the vehicle may be rear-wheel driven. Furthermore, when both the respective batteries 400 mounted in the first drive module 110 and the second drive module 120 provide driving energy, the vehicle may be four-wheel driven.

Since the battery selectively provides driving energy as described above, a driving mode may be variably adjusted according to a user's need. For example, when the vehicle travels on a general road, the vehicle may be controlled to be two-wheel driven to improve fuel efficiency, and when the vehicle travels on a mountain road or on a frozen road or it is directed to increase riding comfort, the vehicle may be controlled to be four-wheel driven. Therefore, the vehicle according to various exemplary embodiments of the present invention is advantageous in that a driving mode of the vehicle may be suitably controlled according to the user's purpose. That is, even though the battery is mounted, the battery does not provide driving energy at all times.

Referring to FIG. 2, the battery 400 may be mounted in the battery-mounting portion 300 of the first drive module 110, without being mounted in the battery-mounting portion 300 of the second drive module 120. In the instant case, only the two drive wheels W on the front side of the vehicle are actively driven by the battery 400 and the two drive wheels W on the rear side of the vehicle are passively driven, and thus, a front-wheel drive vehicle may be formed.

Referring to FIG. 3, the battery 400 may be mounted in the battery-mounting portion 300 of the second drive module 120, without being mounted in the battery-mounting portion 300 of the first drive module 110. In the instant case, only the two drive wheels W on the rear side of the vehicle are actively driven by the battery 400 and the two drive wheels W on the front side of the vehicle are passively driven, and thus, a rear-wheel drive vehicle may be formed.

Figure 4:
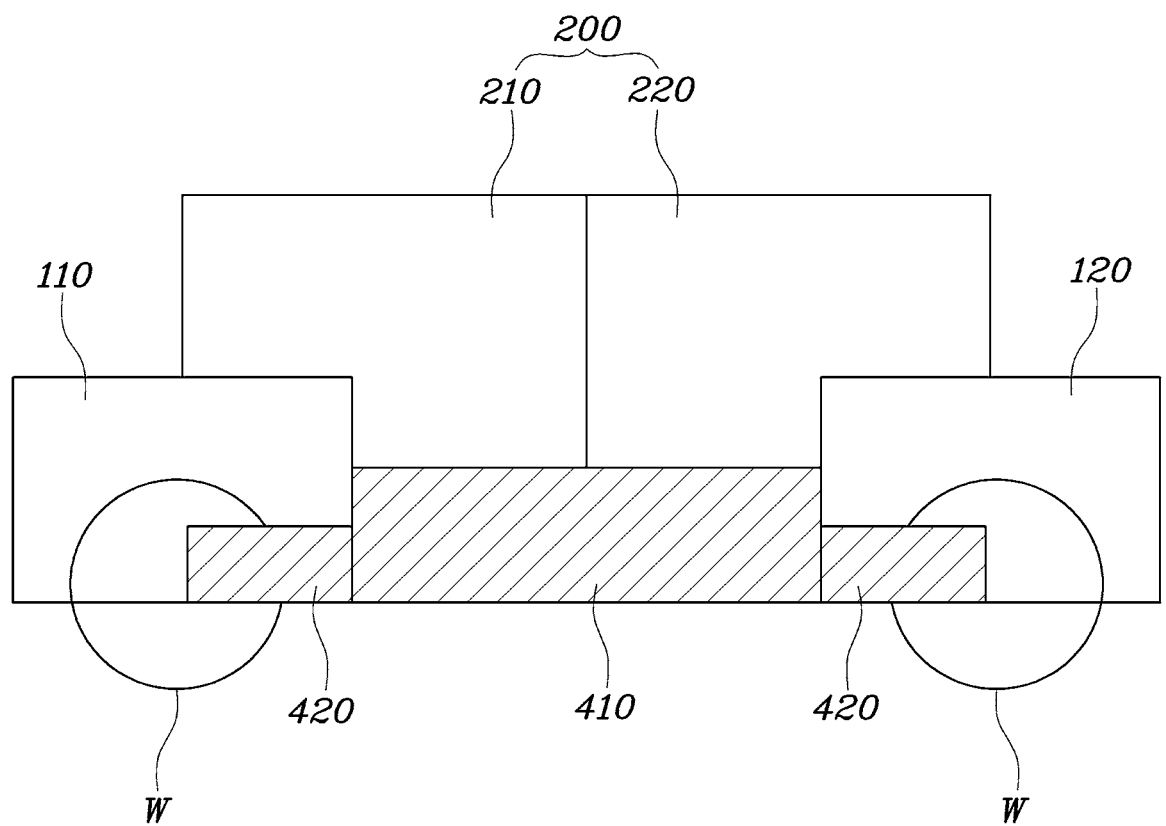
Figure 5:
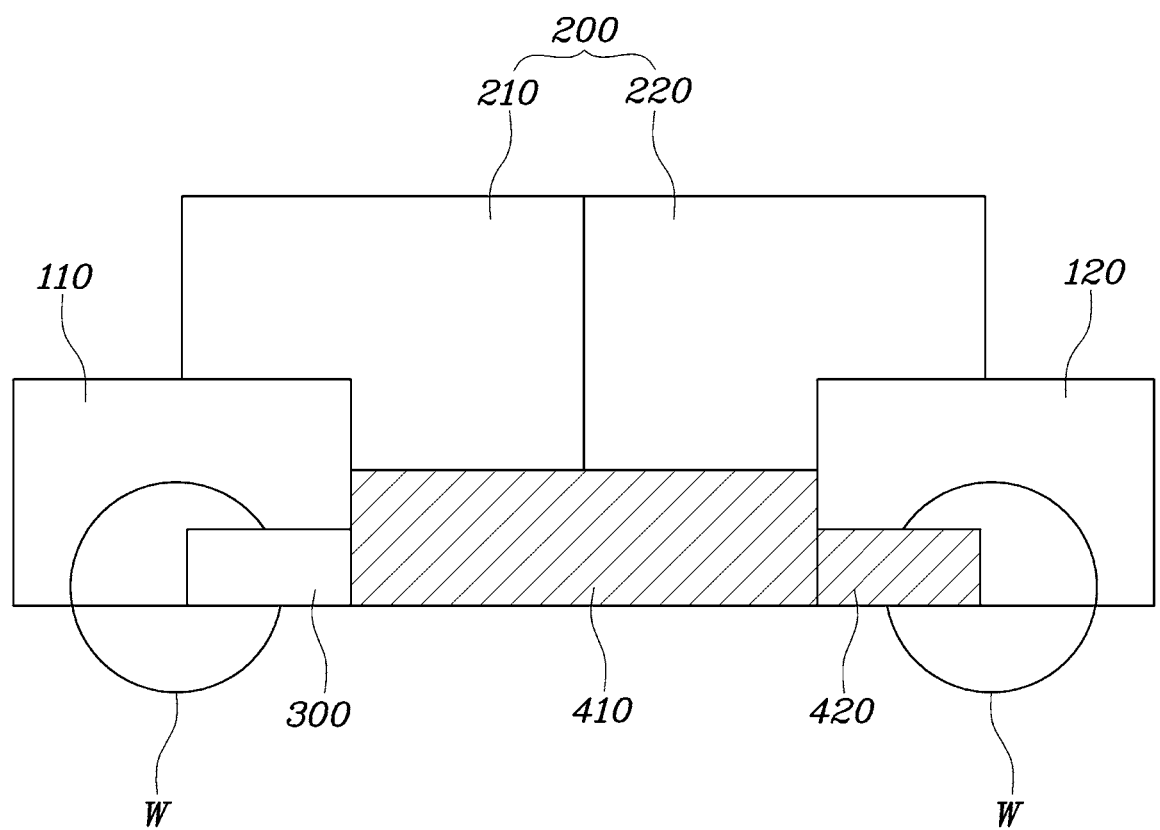
Figure 6:
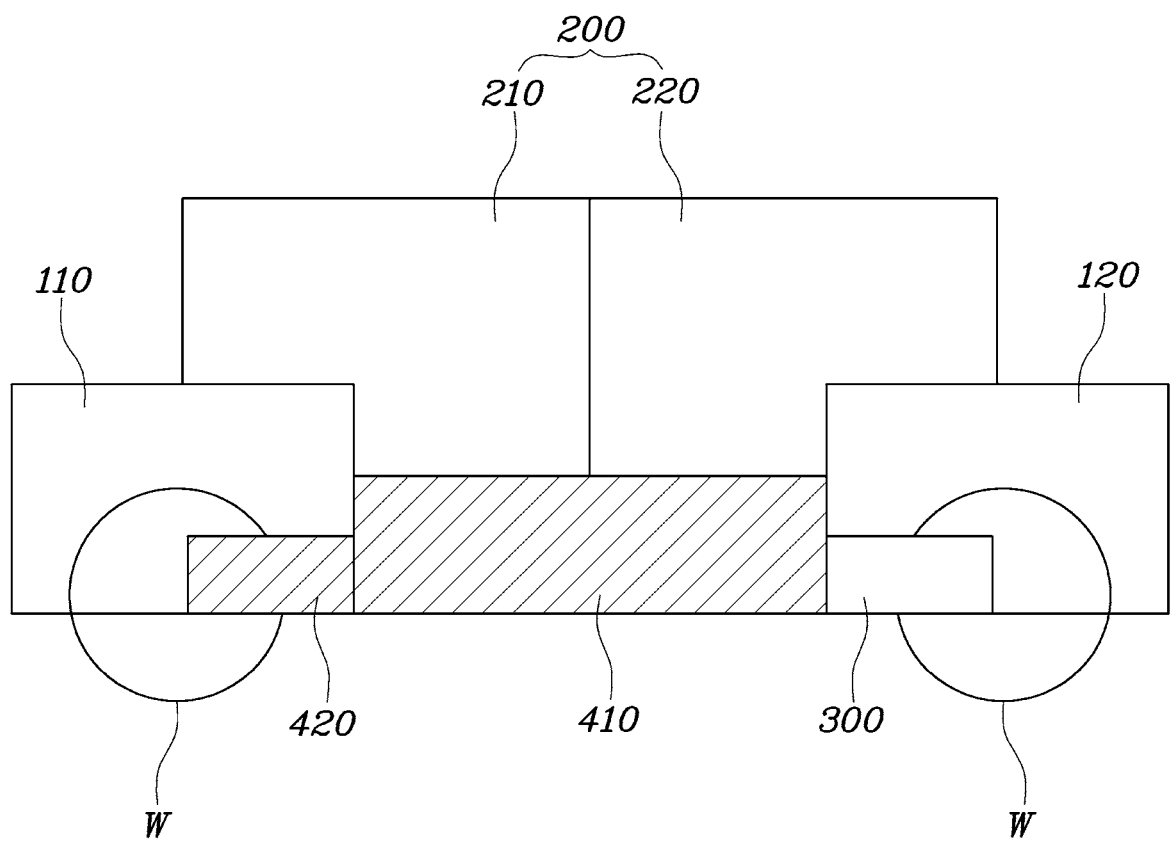

Referring to FIG. 4, FIG. 5 and FIG. 6, the drive module 100 may include the first drive module 110 mounted on the front side of the vehicle and the second drive module 120 mounted on the rear side of the vehicle, and the body module 200 may include a first body module 210 connected to the first drive module 110 and a second body module 220 connected to the second drive module 120 to form the body. In the exemplary embodiments illustrated in FIG. 4, FIG. 5 and FIG. 6, the two drive modules 110 and 120 and the two body modules 210 and 220 are combined to each other to configure the body. In various exemplary embodiments of the present inventions, the first body module 210 and the second body module 220 are communicatively connected to each other, expanding the indoor space.

Referring to FIG. 4, the battery 400 may be mounted in both the respective battery-mounting portions 300 of the first drive module 110 and the second drive module 120. In the instant case, all the four drive wheels W are actively driven by the batteries 400, and thus, a four-wheel drive vehicle may be formed.

Referring to FIG. 5, the battery 400 may be mounted in the battery-mounting portion 300 of the first drive module 110, without being mounted in the battery-mounting portion 300 of the second drive module 120. In the instant case, only the two drive wheels W on the front side of the vehicle are actively driven by the battery 400 and the two drive wheels W on the rear side of the vehicle are passively driven, and thus, a front-wheel drive vehicle may be formed.

Referring to FIG. 6, the battery 400 may be mounted in the battery-mounting portion 300 of the second drive module 120, without being mounted in the battery-mounting portion 300 of the first drive module 110. In the instant case, only the two drive wheels W on the rear side of the vehicle are actively driven by the battery 400 and the two drive wheels W on the front side of the vehicle are passively driven, and thus, a rear-wheel drive vehicle may be formed.

Figure 7:
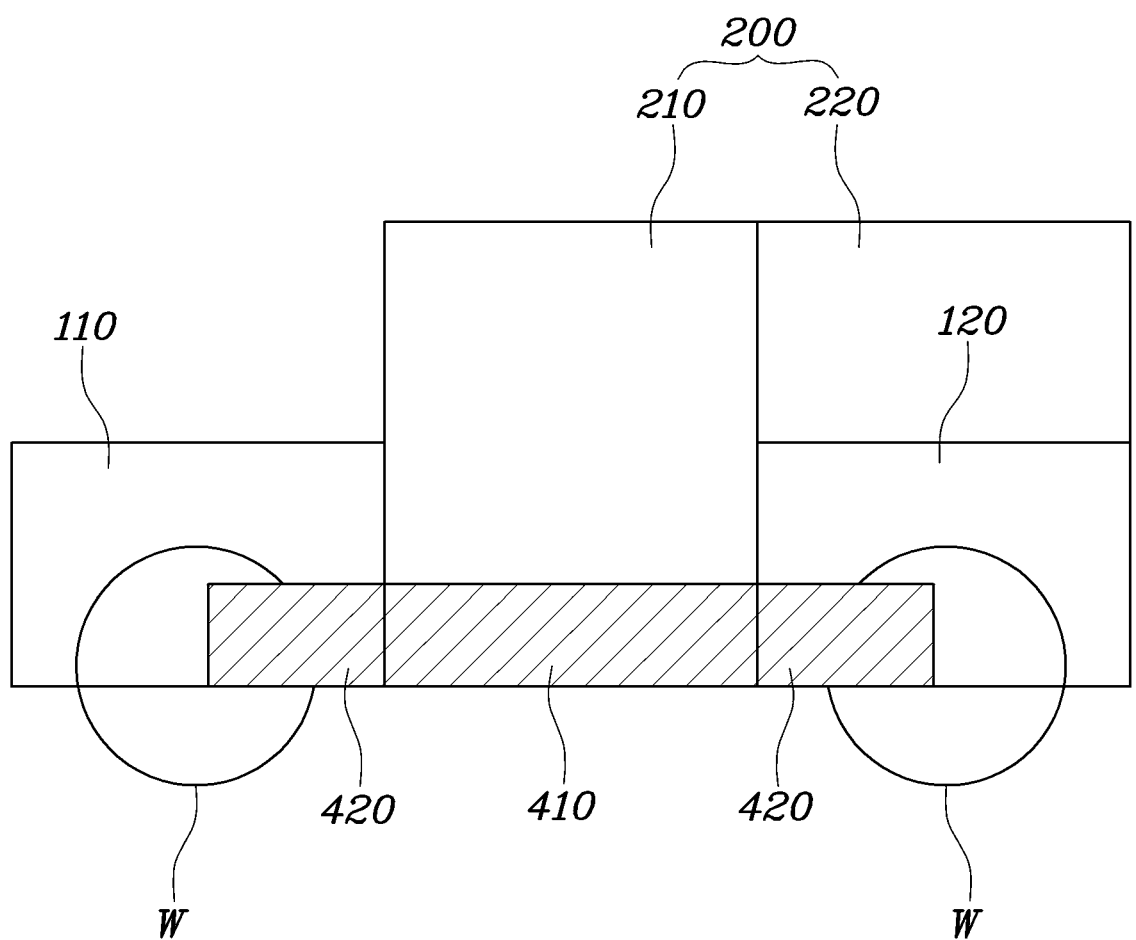
Figure 8:
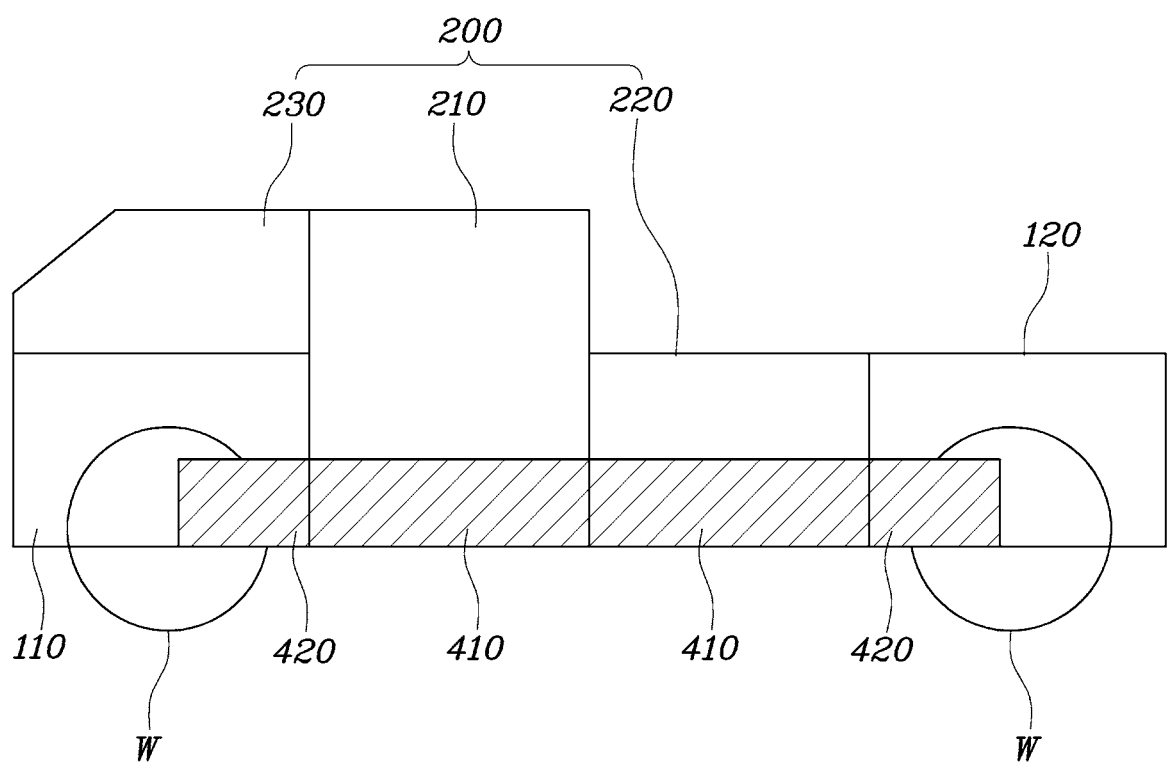

Referring to FIGS. 7 and 8, the number of body modules 200 may be three or more to form a body. As an exemplary embodiment of the present invention, the body module 200 includes first body module 210, second body module 220 and third body module 230.

The body module 200 may be a space that meets a purpose of the vehicle according to a need, and thus designed to meet the purpose of the vehicle. For example, the body modules 200 may be combined into any of various vehicles such as a passenger car, a freight car, a freezer, a luggage compartment, a camping car, or a bus, and the body modules 200 may be appropriately connected to each other.

Likewise, the number of drive modules 100 may be three or more to form a body. When a weight of the body module 200 increases, two or more drive modules may be required to drive the body module 200. For example, in the case of a freight vehicle that needs to load heavy-weight luggage therein, the number of body modules 200 may increase, and accordingly, the number of drive modules 100 may appropriately increase to assemble the freight car.

Since the body modules 200 and the drive modules 100 are selectively combined to each other to selectively configure a vehicle to meet the purpose as described above, a user only needs to have respective modules to assemble a body. Accordingly, there is an advantage in that a vehicle may be suitably used according to any of more various purposes when the modules are combined with each other than when a finished vehicle is purchased.

Figure 9:
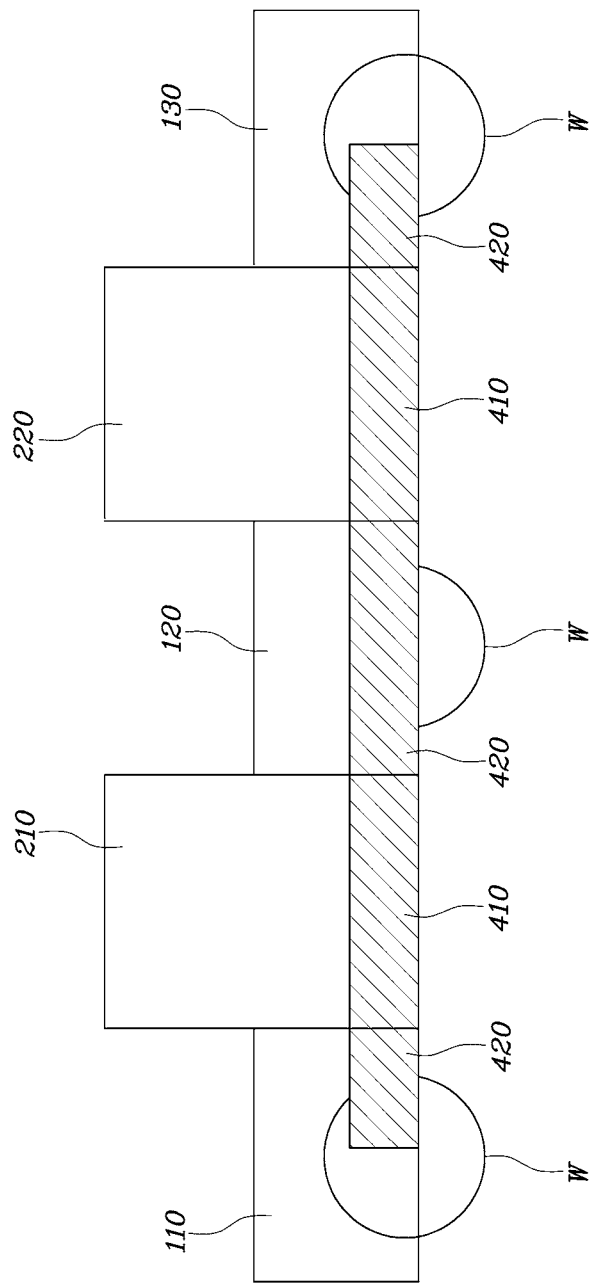

Referring to FIG. 9, three or more drive modules 100 may be provided, including the first drive module 110, the second drive module 120, and a third drive module 130. The three or more drive modules 100 may be provided depending on the weight of the body or the purpose of the vehicle, and the number of drive modules 100 is not limited.

Figure 10:
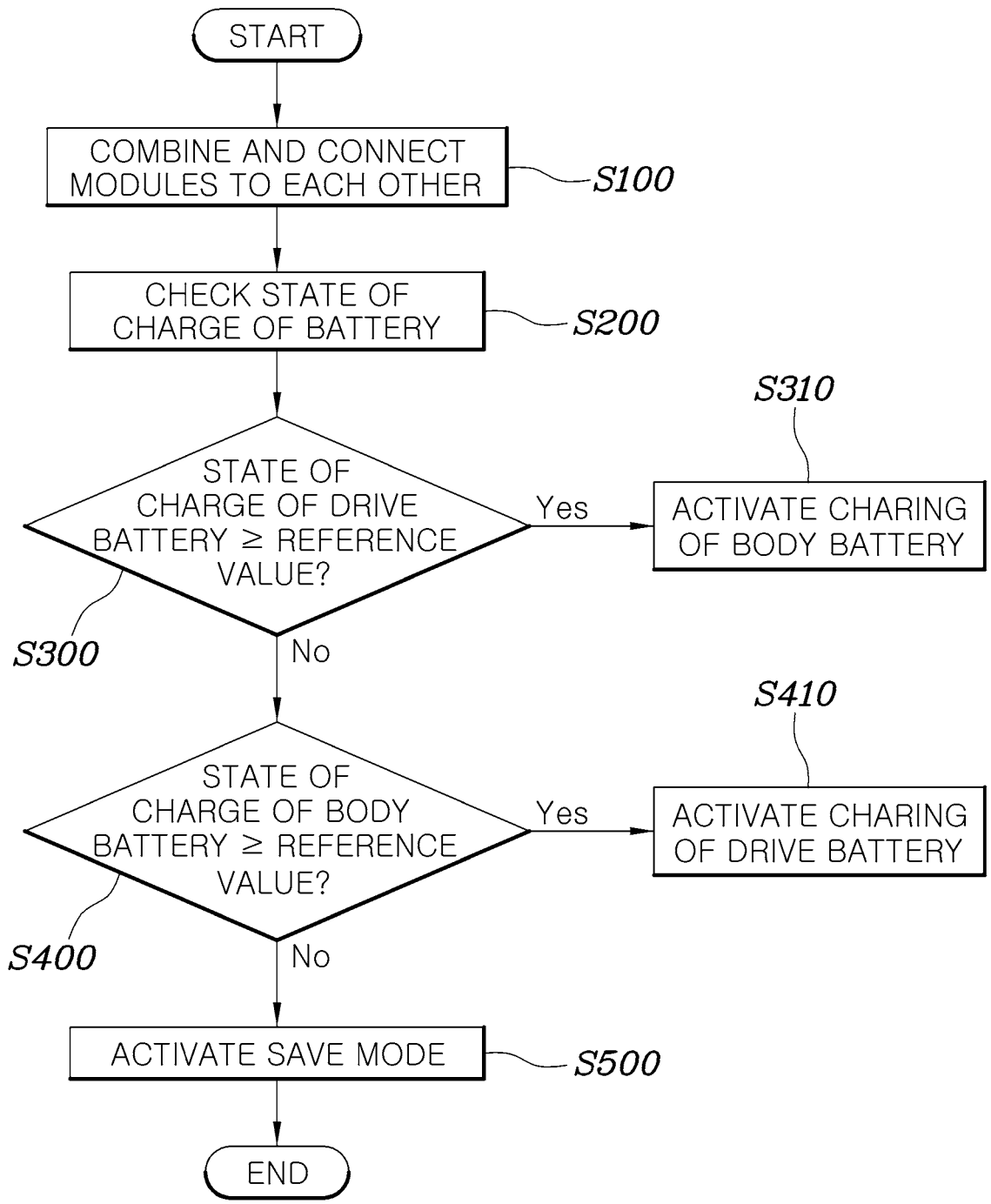
FIG. 10 is a flow chart illustrating a method of operating a battery of a variable body vehicle according to various exemplary embodiments of the present invention.

FIG. 10 is a flow chart illustrating a method of operating the battery 400 of the vehicle according to various exemplary embodiments of the present invention.

The body battery 410 and the drive battery 420 may be connected to each other. When a state of charge (SOC) value of any one of the body battery 410 and the drive battery 420 is equal to or greater than a predetermined level, the any one may charge the other one. A charging method when the vehicle according to various exemplary embodiments of the present invention is driven will be described below.

The drive modules 100 and the body modules 200 are selectively combined and connected to each other to configure a body (S100). States of charge of the body battery 410 and the drive battery 420 are checked (S200).

When the checked state of charge of the drive battery 420 is higher than or equal to a predetermined reference value (S300), the charging of the body battery 410 may be activated (S310). When the vehicle is stationary or not travelling, the drive battery 420 may charge the body battery 410. Furthermore, when the drive module 100 is running, the drive battery 420 may be driven while charging the body battery 410.

When the checked state of charge of the body battery 410 is higher than or equal to the predetermined reference value (S400), the charging of the drive battery 420 may be activated (S410).

When both the checked states of charge of the body battery 410 and the drive battery 420 are lower than the predetermined reference value (S400), a save mode in which the vehicle travels while saving the battery 400 may be activated (S500). In the save mode, to save the battery 400, a program for, for example, travelling at a constant speed or minimizing power consumption in the indoor space may be executed.

The vehicle according to various exemplary embodiments of the present invention is advantageous in that it is sufficient for a manufacturer to manufacture drive modules and body modules only, preventing loss due to dead stock of finished vehicles, facilitating a manufacturing process, and reducing costs.

Furthermore, a buyer may assemble a body for use according to a purpose, making it possible to use a vehicle that meets the purpose, without having a vehicle for each purpose of use, and selectively control a driving mode of the vehicle.

Furthermore, the body battery and the drive battery are configured to be charged by each other based on states of charge thereof, making it possible to use the batteries efficiently.

In an exemplary embodiment of the present invention, a controller is installed in the vehicle to perform the flow chart of FIG. 10.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   a plurality of drive modules having drive wheels provided at a lower portion of the plurality of drive modules;
   a plurality of body modules coupled to an external side of at least one of the plurality of drive modules and forming an internal space of the vehicle; and
   a battery-mounting portion formed in at least one of the plurality of drive modules and the plurality of body modules to mount a battery therein, providing electric power to the at least one of the plurality of drive modules and the plurality of body modules from the battery,
   wherein the battery is selectively mounted in the battery-mounting portion of the at least one of the plurality of drive modules and the plurality of body modules, and the vehicle is driven by the at least one of the plurality of drive modules and the plurality of body modules, and
   wherein the vehicle is reconfigurable by selecting a predetermined number from the plurality of body modules and the plurality of drive modules during assembly to serve a desired transportation mode ranging from a high occupancy to a single occupancy.

2. The vehicle of claim 1, wherein the plurality of drive modules includes a first drive module mounted on a front side of the vehicle and a second drive module mounted on a rear side of the vehicle, and the plurality of body modules is connected between the first drive module and the second drive module to form a body of the vehicle.

3. The vehicle of claim 2, wherein the battery is mounted in respective battery-mounting portions of the first drive module and the second drive module so that the vehicle is selectively four-wheel or two-wheel driven.

4. The vehicle of claim 2, wherein the battery is mounted in the battery-mounting portion of the first drive module, without being mounted in the battery-mounting portion of the second drive module so that the vehicle is front-wheel driven.

5. The vehicle of claim 2, wherein the battery is mounted in the battery-mounting portion of the second drive module, without being mounted in the battery-mounting portion of the first drive module so that the vehicle is rear-wheel driven.

6. The vehicle of claim 1, wherein the plurality of drive modules includes a first drive module mounted on a front side of the vehicle and a second drive module mounted on a rear side of the vehicle, and the plurality of body modules includes a first body module connected to the first drive module and a second body module connected to the second drive module.

7. The vehicle of claim 6, wherein the battery is mounted in respective battery-mounting portions of the first drive module and the second drive module so that the vehicle is selectively four-wheel or two-wheel driven.

8. The vehicle of claim 6, wherein the battery is mounted in a battery-mounting portion of the first drive module, without being mounted in a battery-mounting portion of the second drive module so that the vehicle is front-wheel driven.

9. The vehicle of claim 6, wherein the battery is mounted in a battery-mounting portion of the second drive module, without being mounted in a battery-mounting portion of the first drive module so that the vehicle is rear-wheel driven.

10. The vehicle of claim 1, wherein a total number of the plurality of drive modules and the plurality of body modules is at least three, and the at least three drive modules and body modules are connected to each other so that the vehicle is multiple-wheel driven.

11. The vehicle of claim 1, wherein a body battery is mounted in the battery-mounting portion of at least one of the plurality of body modules and a drive battery is mounted in the battery-mounting portion of at least one of the plurality of drive modules, the body battery providing electric power to an internal space of the vehicle and the drive battery providing electric power to the drive wheels.

12. The vehicle of claim 11, wherein the body battery and the drive battery are connected to each other, and when a state of charge (SOC) value of one of the body battery and the drive battery is equal to or greater than a predetermined level, the one of the body battery and the drive battery charges a remaining one of the body battery and the drive battery.

13. The vehicle of claim 11, wherein the body battery and the drive battery are connected to each other, and when a state of charge (SOC) value of the drive battery is equal to or greater than a predetermined level, the drive battery charges the body battery in a stationary state of the vehicle or is driven while charging the body battery in a travelling state of the vehicle.

14. The vehicle of claim 11, wherein the body battery and the drive battery are connected to each other, and when a state of charge (SOC) value of the drive battery is lower than a predetermined level and when a state of charge (SOC) value of the body battery is equal to or greater than the predetermined level, the body battery charges the drive battery.

15. The vehicle of claim 11, wherein when states of charge of the body battery and the drive battery are lower than a predetermined level, a save mode is activated by a controller.

16. A method of controlling charging of a vehicle, the method comprising:
   in the vehicle of a plurality of drive modules having drive wheels provided at a lower portion of the plurality of drive modules; a plurality of body modules coupled to an external side of at least one of the plurality of drive modules and forming an internal space of the vehicle; and a battery-mounting portion formed in at least one of the plurality of drive modules and the plurality of body modules to mount a battery therein, providing electric power to the at least one of the plurality of drive modules and the plurality of body modules from the battery,
   wherein the battery is selectively mounted in the battery-mounting portion of the at least one of the plurality of drive modules and the plurality of body modules, and the vehicle is driven by the at least one of the plurality of drive modules and the plurality of body modules, and
   wherein the vehicle is reconfigurable by selecting a predetermined number from the plurality of body modules and the plurality of drive modules during assembly to serve a desired transportation mode ranging from a high occupancy to a single occupancy, wherein a body battery is mounted in the battery-mounting portion of at least one of the plurality of body modules and a drive battery is mounted in the battery-mounting portion of at least one of the plurality of drive modules, the body battery providing electric power to the internal space of the vehicle and the drive battery providing electric power to the drive wheels, and wherein the body battery and the drive battery are connected to each other:

charging, by one of the body battery and the drive battery under control of a controller, a remaining one of the body battery and the drive battery, when a state of charge (SOC) value of the one of the body battery and the drive battery is equal to or greater than a predetermined level.

17. The method of claim 16, further including:

charging, by the drive battery under control of the controller, the body battery in a stationary state of the vehicle or driving the drive battery while charging the body battery in a travelling state of the vehicle, when a state of charge (SOC) value of the drive battery is equal to or greater than a predetermined level.

18. The method of claim 16, further including:

charging, by the body battery under control of the controller, the drive battery, when a state of charge (SOC) value of the drive battery is lower than a predetermined level and when a state of charge (SOC) value of the body battery is equal to or greater than the predetermined level.

19. The method of claim 16, further including:

activating, by a controller, a save mode, when states of charge of the body battery and the drive battery are lower than a predetermined level.

\* \* \* \* \*